United States Patent [19]

Sakuta et al.

[11] Patent Number: 5,009,713
[45] Date of Patent: Apr. 23, 1991

[54] CEMENT COMPOSITION AND A PROCESS FOR PREPARATION THEREOF

[75] Inventors: Masaharu Sakuta, Tokyo; Toshiharu Urano, Nagoya; Kyoichi Tanaka; Masashi Sugiyama, both of Ibaraki; Shyuzo Endoh, Tokyo; Keisuke Fujioka, Kawasaki, all of Japan

[73] Assignees: Fujisawa Pharmaceutical Company, Ltd.; Takenaka Komuten Company, Ltd., both of Osaka; Nippon Nyukazai Company, Ltd., Tokyo, all of Japan

[21] Appl. No.: 14,593

[22] Filed: Feb. 13, 1987

[30] Foreign Application Priority Data

Feb. 25, 1986 [JP] Japan ................. 61-038277

[51] Int. Cl.$^5$ ............................................. C04B 7/00
[52] U.S. Cl. ........................................ 106/727; 106/808
[58] Field of Search ............... 524/4; 106/90, 314, 106/727, 808

[56] References Cited

U.S. PATENT DOCUMENTS

| | | | |
|---|---|---|---|
| 4,069,063 | 1/1978 | Ball | 106/97 |
| 4,116,706 | 9/1978 | Previte | 106/90 |
| 4,209,336 | 6/1980 | Previte | |
| 4,265,674 | 5/1981 | Debus et al. | 106/93 |
| 4,401,472 | 8/1983 | Gerber | 106/90 |
| 4,405,372 | 9/1983 | Serafin et al. | 106/90 |
| 4,519,842 | 5/1985 | Gerber | |

FOREIGN PATENT DOCUMENTS

| | | |
|---|---|---|
| 46-1683 | 9/1971 | Japan . |
| 59-128241 | 7/1984 | Japan . |
| 59-128250 | 7/1984 | Japan . |
| 59-164664 | 9/1984 | Japan . |
| 60-103061 | 6/1985 | Japan . |
| 61-40856 | 2/1986 | Japan ............... 524/4 |

OTHER PUBLICATIONS

Chemical Abstracts, vol. 103, No. 4, Jul. 1985, p. 240, No. 26321a.

*Primary Examiner*—Olik Chaudhuri
*Assistant Examiner*—Andrew Griffin
*Attorney, Agent, or Firm*—Oblon, Spivak, McClelland, Maier & Neustadt

[57] ABSTRACT

The invention relates to a hydraulic cement composition comprising, as a carbonation inhibitor of the cement composition, at least one compound of the formula (I):

$$A-(Y_n-H)_l$$

wherein A is a polyamine residue containing 2–10 carbon atoms,

Y is $-C_3H_6-O-$, l is a number equal to 1–8, n is a number equal to 1–4, the product of n×l is equal to 13–20, the active hydrogen(s) involved in the amino groups in the polyamine residue being partly or wholly substituted with the residue(s) of propylene oxide.

9 Claims, No Drawings

CEMENT COMPOSITION AND A PROCESS FOR PREPARATION THEREOF

This invention relates to a cement composition. More particularly, this invention relates to a cement composition comprising, as a carbonation inhibitor of a cement composition, the compound (I) defined below, whereby the service life of reinforced concrete structures can be substantially prolonged.

So far the service life of reinforced concrete structures has been estimated at about 50 to 60 years. This service life is generally determined by the phenomenon of carbonation of concrete from the concrete surface. While the cement paste in concrete shows strong basicity (pH 12-13) mainly due to the presence of calcium hydroxide and alkali metal hydroxides (NaOH, KOH), calcium hydroxide is readily neutralized upon exposure to carbon dioxide gas in the presence of water. Once the carbonation region has reached the sites of reinforcing steel, the reinforcing steel rust easily and, as a result, the reinforced concrete structures lose their structural safety. The measures so far taken to prolong the life of reinforced concrete structures, which is determined by the phenomenon mentioned above, include, among others:

(1) Increasing the thickness of the cover of reinforcing steel with concrete;
(2) Reducing the water cement ratio in concrete compositions;
(3) Providing the concrete surface with a highly airtight finishing materials; and
(4) Using ethylene, vinylacetate and vinylchloride copolymer emulsion as a carbonation inhibitor (Cf. Japanaese Kokai Tokyo Koho 60-103061).

These known measures are indeed effective in preventing significant deterioration of concrete but are not so effective in prolonging the life of reinforced concrete substantially.

In particular, the use of a finishing material for preventing carbonation, though effective on a short-term basis, still has a problem in that it cannot be said to constitute a highly reliable method since the durability of the finishing material itself becomes a problem.

To solve the above problems, the present inventors conducted investigations in search of compounds which could be effective in inhibiting carbonation. As a result, they found that the rate of concrete carbonation can be decreased remarkably when the compound (I) as defined below estimably capable of catching carbon dioxide gas and forming complexes therewith is added to concrete.

A compound to be used as a cement carbonation inhibitor is represented by the general formula (I):

$$A(X_mY_n\text{-}H)_l \qquad (I)$$

wherein A is a polyamine residue containing 2-10 carbon atoms, X is -CH$_2$CH$_2$O-, Y is -C$_3$H$_6$O-, l is a number equal to 1-8, m is a number equal to 0-3, n is a number equal to 0-4, the product m×l is equal to 0-16, the product n×l is equal to 0-20, (m×l+n×l) is equal to 1-20 and X and Y are arranged in an optional order, each -X$_m$Y$_n$-H moiety thus being a residue of an ethylene oxide- or propylene oxide-derived addend or an ethylene oxide or propylene oxide homopolymer or ethylene oxide-propylene oxide block or random copolymer addend.

In the above general formula, the polyamine from which the polyamine residue A containing 2-10 carbon atoms is formed includes, among others, aliphatic polyamines such as ethylenediamine, diethylenetriamine, triethylenetetramine, tetraethylenepentamine, pentaethylenehexamine, piperazine, propylenediamine and hexamethylenediamine, aromatic ring-containing polyamines such as xylylenediamine, and aromatic amines such as m-phenylenediamine.

The active hydrogens involved in the amino groups in these polyamines are partly or wholly substituted with residues(s) of ethylene oxide and/or propylene oxide [(X$_m$Y$_n$-H)$_l$].

Preferred among these polyamines are aliphatic amines such as ethylenediamine since they produce particularly good carbonation inhibiting effect.

X and Y, which represent single ethylene oxide- and propylene oxide-derived addends, respectively, may form respective homopolymer addends or an ethylene oxide-propylene oxide block or random copolymer addend, with X and Y being arranged in an optional order. When (m×l+n×l) is 21 or more, the corresponding compound functions as a surface active agent, shows a high degree of foaming and causes decreases in strength characteristics of hardened cement mixtures, hence is undesirable.

The compound (I) to be used in this invention is the known one and can be prepared, for example, by reacting polyamines containing 2-10 carbon atoms with monomer or polymer of an ethylene oxide and (or) propylene oxide in a conventional manner.

Representative examples of the compound (I) are as follows:

Compound 1 (m = 1, n = 0, l = 4):

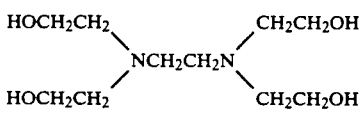

Compound 2 (m = 3, n = 0, l = 4):

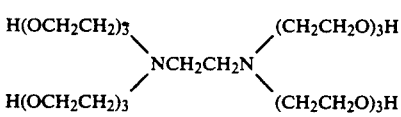

Compound 3 (m = 0, n = 1, l = 4):

This compound was prepared according to Preparation 1.

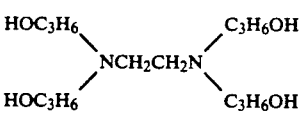

Compound 4 (m = 0, n = 4, l = 4):

This compound was prepared according to Preparation 2.

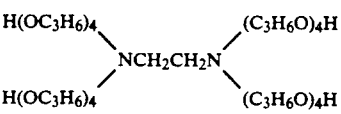

-continued
Compound 5 (m = 2, n = 2, l = 4) (random copolymer):
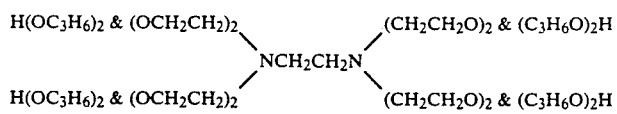
Compound 6 (m = 1, n = 0, l = 5):
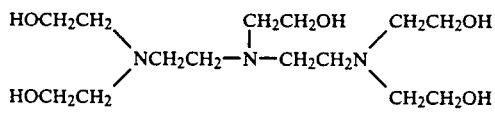
Compound 7 (m = 0, n = 3, l = 5):
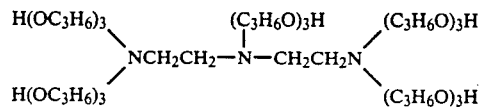
Compound 8 (m = 1, n = 2, l = 5) (block copolymer):
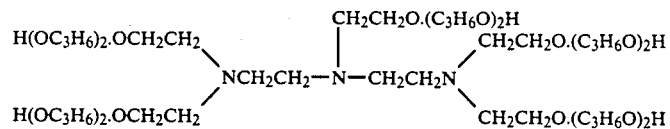
Compound 9 (m = 2, n = 0, l = 6):
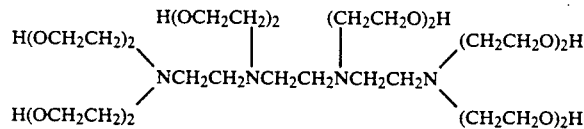
Compound 10 (m = 0, n = 3, l = 6):
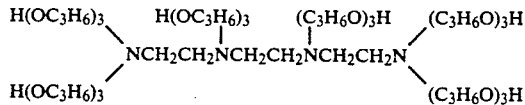
Compound 11 (m = 1, n = 0, l = 8):
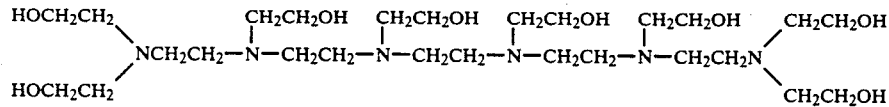
Compound 12 (m = 2, n = 0, l = 8):
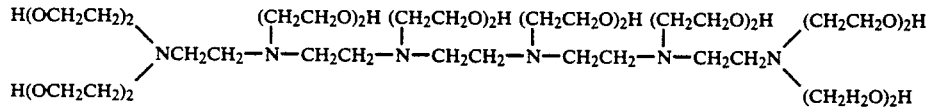
Compound 13 (m = 0, n = 1.5, = 8):
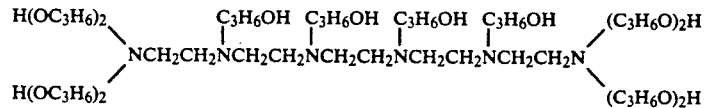
Compound 14 (m = 1, n = 1.5, l = 8) (block copolymer):
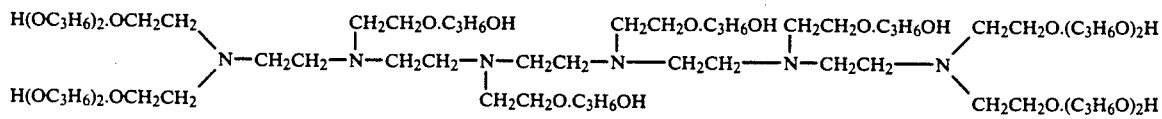
Compound 15 (m = 1, n = 0, l = 4):
This compound was prepared according to Preparation 3.

-continued

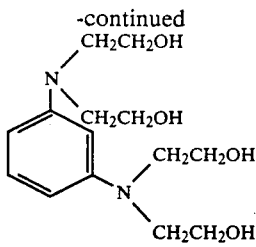

Compound 16 (m = 0, n = 2, 1 = 4):

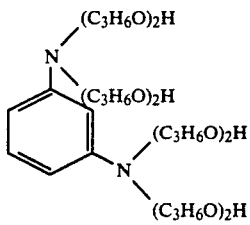

Compound 17 (m = 2, n = 0, 1 = 4):

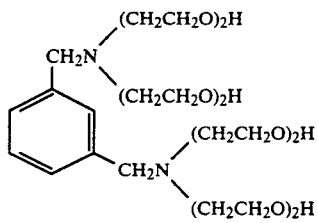

Compound 18 (m = 2, n = 2, 1 = 4) (block copolymer):

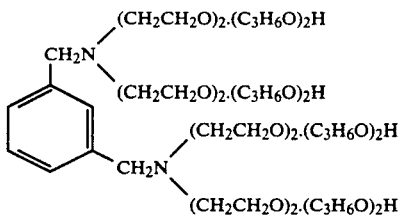

Note: Values of m and n mean a number of average moles.

PREPARATION 1

Ethylenediamine (180 g, 3 moles) was charged into a stainless steel autoclave equipped with a stirrer, thermometer, pressure gage and reactant inlet tube. The autoclave was purged with dry nitrogen gas to remove free of oxygen and heated to 100° C. with stirring. To the reactor there was added propylene oxide [total volume: 696 g (12.0 moles)] at an average temperature of 140° C. over a period of three hours, and then kept half an hour on the same temperature to give the final product, Compound 3 (849 g). This product was a viscous, amber-colored liquid, and its amine value (KOH mg/g) was 374.2 and its hydroxyl value (KOH mg/g) was 776.3. The molecular weight of the product was 289.1 as determined by the hydroxyl value, and accordingly the theoretical average number of moles of oxypropylene was 3.95.

PREPARATION 2

Into the same apparatus as used in Preparation 1 there was charged ethylenediamine (50 g, 0.833 moles). To this reactor there was added propylene oxide (total volume: 696 g, 12.0 moles) at an average temperature of 140° C. over a period three hours to give the final product, Compound 4 (773 g). The product was a viscous, amber-colored liquid and its amine value (KOH mg/g) was 110.9 and its hydroxyl number (KOH mg/g) was 230.0. The molecular weight of the product was 976 as determined by the hydroxyl number, and accordingly the theoretical average number of moles of oxypropylene was 15.8.

PREPARATION 3

Into the same apparatus as used in Preparation 1 there was charged ethylenediamine (60 g, 1.0 mol). To this reactor there was added a mixture of ethylene oxide (total volume: 352 g, 8.0 moles) and propylene oxide (total volume: 465 g, 8.0 moles) at an average temperature of 140° C. over a period of three hours to give the final product, Compound 5 (850 g). The product was a viscous, amber-colored liquid, and its amine value (KOH mg/g) was 122.8 and its hydroxyl value (KOH mg/g) was 265.1. The molecular weight of the product was 847 as determined by the hydroxyl value and accordingly the theoretical average number of moles of oxyethylene plus oxypropylene was 15.4.

The cement composition according to this invention is a hydraulic cement composition, such as mortars and concretes, in which the compound (I) has been incorporated.

The compound (I) is incorporated into hydraulic cement by a conventional method.

The proportion of the compound (I) in the cement composition according to this invention is 0.1 to 10% and preferably 0.5 to 5% (weight percent based on cement). If the proportion is less than the above range, no sufficient effect can be obtained. If the range is exceeded, the result will not be better than that obtained within the range and the use of excess amounts is uneconomical.

In general for mortars, an aggregate may be sand or other fine aggregate, and the proportion of fine aggregate is in the range of about 25% to 80% by weight based upon the total weight of the cement composition, depending upon the nature of the aggregate and the desired properties and use of the cement composition.

Further in general for concretes, an aggregate may be fine aggregate, such as sand, and coarse aggregate, such as crushed stone or gravel, and the proportion of fine aggregate is in the range of about 20% to 50%, and the proportion of coarse aggregate is in the range of about 35% to 55% by weight based upon the total weight of the cement composition, depending upon the nature of the aggregate and desired properties and use of the composition.

For both the mortars and concretes, the amount of water employed generally should be enough to effect hydraulic setting of the cement present in the cement composition and to provide suitable workability. This may range from about 20% to about 70% by weight of the cement in the cement mixture for mortars and from about 25% to about 80% by weight of the cement in the cement composition for concretes. The precise amounts of water depend upon the end use of the cement composition, as well as the aggregate and other admixtures present in the cement composition.

Preferred water-cement ratio of the cement composition according to this invention is 20 to 70% for mortars and 25 to 80% for concretes, depending upon desired properties and use of the cement composition.

In the cement composition according to this invention, there may be incorporated various water-reducing admixtures such as water-reducing agents (for example, sodium gluconate, lignosulfonate, sulfonatednaphtalene-formaldehyde condensate, sulfonated melamine-formaldehyde condensate, etc.) and air-entraining (AE) agents so as to improve the quality of concrete, etc.

The carbonation inhibitors according to the invention can be added to concrete in the same manner as the conventional additives. Thus, they may be added to the mixing water beforehand or to a concrete mix once prepared. Further, they may be added after the arrival at the spots of concrete mixes carried by truck mixer agitators. The addition mode to be employed may be decided depending on the carbonation inhibitor employed, the conditions of the concrete structure, and so forth.

The carbonation inhibitors according to the invention are never subjected to limitations relative to the kind of cement, the kind of aggregate or the kind of each additive or admixture used combinedly therewith. Thus, they may be added to any kinds of cements that are available on the market, such as ordinary cement, high-early-strength cement, moderate heat cement, blast-furnace slag cement and fly ash cement. Such cements may partly be substituted with fly ash, ground blast furnace slag, a siliceous additive and/or the like. Such substitution may lead to achievement of the object of the invention in a favorable manner.

The cement composition according to this invention can be prepared by the following method:

Mortars can be prepared by incorporating the compound (I) in an amount of between 0.1% and 10% by weight based upon the weight of the cement with mortars.

Said mortars may include cement (15–55%), water (5–25%), fine aggregate (35–75%), air entraining agent (0–1% of cement) and/or water-reducing agent (0–5% of cement).

Concretes can be prepared by incorporating the compound (I) in an amount of between 0.1% and 10% by weight based upon the weight of cement with concretes.

Said concretes may include cement (6–30%), coarse aggregate (35–60%), fine aggregate (20–50%), water (6–15%), and air entraining agent (0–1% of cement) and/or water-reducing agent (0–5% of cement).

In some instances, the carbonation inhibitors according to the invention may entrain air. In such case, it is advisable to use a known defoaming agent combinedly.

The effects of this invention are explained by way of the following test example.

TEST

Eighteen kinds of the carbonation inhibitor according to the invention and five kinds for comparison were respectively added to a concrete composition given in Table 1 at an addition level of 4% by weight on the cement weight basis. The addition was made by adding each inhibitor to the mixing water.

TABLE 1

| Slump (cm) | Air content (%) | Water cement ratio (%) | Materials used for making 1 m³ of concrete (kg) | | | |
|---|---|---|---|---|---|---|
| | | | Cement | Water | Sand | Gravel |
| 18 | 4 | 57.5 | 317 | 182 | 765 | 1027 |

Prism specimens, 10cm×10cm×40cm in size, were made from concrete compositions, cured in moist air at 20° C. for a week and, then, dried under conditions of 20° C. and 60% relative humidity for 2 weeks. These specimens were placed and allowed to stand in a vessel maintained at a temperature of 30° C. and a humidity of 60% (R. H.) in a 5% carbon dioxide gas atmosphere for a month. This test was to promote concrete carbonation due to carbon dioxide gas.

After the one month of standing, the specimens were taken out of the vessel and divided into two approximately in the middle. Each cut surface was sprayed with an ethanol solution of phenolphthalein (concentration 1%). Where concrete retains alkalinity, the surface assumes a red color while the carbonated surface portion remains unchanged in color. In this way, the depth of carbonation from the surface was measured for each specimen.

The results of the carbonation depth measurement are shown in Table 2.

TABLE 2

| Compound (in terms of compound No. given before) | Dept of carbonation (cm) |
|---|---|
| 1 | 0.7 |

TABLE 2-continued

| Compound (in terms of compound No. given before) | Dept of carbonation (cm) |
| --- | --- |
| 2 | 0.8 |
| 3 | 0.6 |
| 4 | 0.6 |
| 5 | 0.8 |
| 6 | 0.8 |
| 7 | 0.6 |
| 8 | 0.7 |
| 9 | 0.8 |
| 10 | 0.6 |
| 11 | 0.7 |
| 12 | 0.8 |
| 13 | 0.6 |
| 14 | 0.7 |
| 15 | 0.7 |
| 16 | 0.6 |
| 17 | 0.8 |
| 18 | 0.7 |
| [For Comparison] | |
| No additive | 2.4 |
| Compound A | 1.4 |
| Compound B | 2.0 |
| Compound C | 1.5 |
| Compound D | 1.7 |

Note:
Compounds A to D are as follows:

Compound A (m = 3, n = 3, l = 4) (block copolymer):

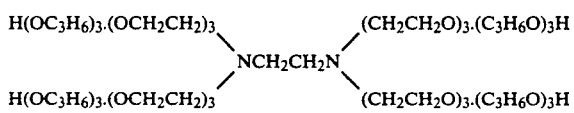

Compound B (m = 4, n = 0, l = 6):

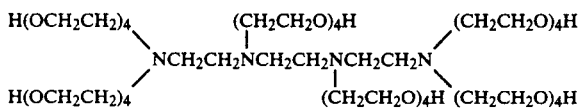

Compound C (m = 2, n = 1, l = 8) (block copolymer):

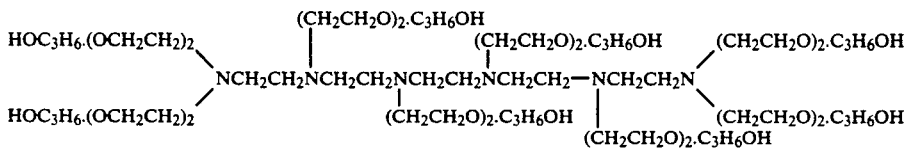

Compound D (m = 4, n = 2, l = 4) (block copolymer):

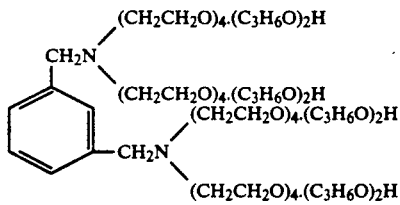

(Note: Values of m and n mean a number of average moles.)

As the results of the above examples clearly indicate, the concrete specimens containing the inhibitors according to the invention were very slow in the rate of carbonation from the surface, or not more than one third in terms of the depth of carbonation. Since it is known that the progress of carbonation is proportional to the root of T ($\sqrt{T}$) (T being the time that has elapsed), the time required for the concrete specimens containing the carbonation inhibitors according to the invention to be carbonated to a certain depth is about 9 times longer as compared with the conventional concrete specimens. Thus, the above results indicate that for actual reinforced concrete structures, the time required for the concrete portion covering the reinforcing steel to be wholly carbonated can be prolonged by 9 times in accordance with the present invention.

As illustrated in the above, the present invention produces a very great effect in prolonging the service life of reinforced concrete structures.

Working examples of this invention are as follows:

EXAMPLE 1

| | (kg/m$^3$) |
| --- | --- |
| Ordinary portland cement | 317 |
| Water | 182 |
| Sand | 765 |
| Gravel | 1027 |
| Compound 3 | 12.7 |

The above materials are mixed to give a concrete.

EXAMPLE 2

| | (kg/m$^3$) |
| --- | --- |
| Ordinary portland cement | 317 |
| Water | 182 |
| Sand | 765 |
| Gravel | 1027 |
| Compound 4 | 12.7 |

The above materials are mixed to give a concrete.
We claim:

1. A hydraulic cement composition comprising, as a carbonation inhibitor of the cement composition, at least one compound of the formula (I):

$$A\text{-}(Y_n\text{-}H)_l \quad (I)$$

wherein A is a polyamine residue containing 2-10 carbon atoms,

Y is $-C_3H_6O-$, l is a number equal to 1-8,
n is a number equal to 1-4,
the product n×l is equal to 13-20,
the active hydrogen(s) involved in the amino groups in the polyamine residue being partly or wholly substituted with the residue(s) of propylene oxide.

2. A hydraulic cement composition comprising a hydraulic cement, sufficient water to effect hydraulic setting of the cement and a compound of the compound (I) of claim 1 in an amount of between 0.1% and 10% by weight based upon the weight of the cement, whereby the carbonation of said cement composition is inhibited.

3. A hydraulic cement composition comprising a hydraulic cement, aggregate in an amount of up to 90% by weight based upon total weight of said cement composition, suffecient water to effect hydraulic setting of the cement, and a compound of the compound (I) of claim 1 in an amount of between 0.1% and 10% by weight based upon the weight of the cement, whereby the carbonation of said cement composition ids inhibited.

4. A hydraulic cement composition of claim 3, wherein the compound (I) is a compound in which A is a residue of ethylenediamine, n is 4 and l is 4.

5. A process for preparing hydraulic cement compositions comprising incorporating, as a carbonation inhibitor, at least one compound of the formula (I):

$$A\text{-}(Y_n\text{-}H)_l \quad (I)$$

wherein A is a polyamine residue containing 2-10 carbon atoms,

Y is $-C_3H_6O-$, l is a number equal to 1-8,
n is a number equal to 1-4,
the product n×l is equal to 13-20,
the active hydrogen(s) involved in the amino groups in the polyamine residue being partly or wholly substituted with the residue(s) of propylene oxide, in an amount of between 0.1% and 10% by weight based upon the weight of the cement, whereby the carbonation of said cement composition is inhibited.

6. A process for preparing hydraulic cement compositions which include hydraulic cement, aggregate in an amount of up to 90% by weight based upon the total weight of said cement compositions, and sufficient water to effect hydraulic setting of the cement, comprising incorporating a compound of the compound (I) of claim 4 in an amount of between 0.1% and 10.0% by weight based upon the weight of the cement, whereby the carbonation of said cement composition is inhibited.

7. A process of claim 6, wherein the compound (I) is a compound in which A is a residue of ethylenediamine, n is 4 and l is 4.

8. A method for inhibiting the carbonation of hydraulic cement compositions which include hydraulic cement, aggregate in an amount of up to 90% by weight based upon the total weight of said cement compositions, and sufficient water to effect hydraulic setting of the cement, comprising incorporating a compound of the compound (I) of claim 1 in an amount of between 0.1% and 10% by weight based upon the weight of the cement, whereby the carbonation of said cement composition is inhibited.

9. A method of claim 4, wherein the compound (I) is a compound in which A is a residue of ethylenediamine, n is 4 and l is 4.

* * * * *